3,467,697
PRODUCTION OF POLYCHLOROBENZOIC ACIDS
Charles F. Kohll and Nanno Fekkes, Amsterdam, Netherlands, assignors to Shell Oil Company, New York, N.Y., a corporation of Delaware
No Drawing. Filed July 8, 1966, Ser. No. 563,709
Claims priority, application Netherlands, July 22, 1965, 6509549
Int. Cl. C07c 51/00, 63/12
U.S. Cl. 260—515      6 Claims

ABSTRACT OF THE DISCLOSURE

Aromatic o-halocarboxylic acids, such as 2,6-dichlorobenzoic acid, are obtained in almost quantitative yield by reacting aromatic o-halodichloromethyl compounds with chlorine and water in the presence of a Lewis acid catalyst such as the chlorides of iron, zinc, antimony and gallium.

---

This invention relates to a process for the manufacture of polychlorobenzoic acids, especially 2,6-dichlorobenzoic acid.

PRIOR ART

A preparation of polychlorobenzoic acids is disclosed by Di Bella, German application 1,139,112, printed Nov. 8, 1962. According to this publication, the methyl substituent of a polychlorotoluene, such as 2,6-dichlorotoluene, or 2,3,6-trichlorotoluene, is chlorinated to produce a mixture of polychlorobenzal chloride and polychlorobenzotrichloride. This mixture is then chlorinated in the presence of water and a strong mineral acid, such as phosphoric, sulfuric, or sulfuric-boric acid, to produce polychlorobenzoic acid. These strong acids are required in relatively high concentration, approximately 0.2 to 3.0 moles per mole of starting polychlorotoluene. The use of such highly concentrated mineral acids presents several drawbacks to a practical and commercially useful method of manufacture. First, concentrated mineral acids present corrosion problems for equipment and safety problems for personnel. Second, large quantities such as are used therein require disposal where the acid cannot be regenerated and where subsequent regeneration is possible, it is feasible only at high cost.

It is also known that hydrolysis of benzal chloride in the presence of small quantities of ferric benzoate or ferric chloride at about 100° C. produces benzaldehyde; see, for example, O. Bayer in Houben-Weyl, "Methoden der Organischen Chemie," E. Muller, ed., 211, vol. 7, Part 1, Georg Thieme Verlag, Stuttgart, 1954.

THE INVENTION

It has now been found that polychlorobenzoic acids, particularly 2,6-dichlorobenzoic acid, can be prepared in almost quantitative yields and in a commercially feasible manner, by treating as aromatic compound, substituted with one or more dichloromethyl groups and additionally substituted in at least one position ortho thereto with a halogen atom, with chlorine and water in the presence of a catalytic amount of a Lewis acid.

REACTANTS

The aromatic starting material is usually an ortho-halo dichloromethyl derivative of benzene or a suitably substituted benzene. As a halogen substituent, fluorine, chlorine or bromine is particularly suitable, chlorine being preferred. According to the invention a halogen atom should occur in one orthoposition with respect to a dichloromethyl group, but not each dichloromethyl group present in the molecule needs to have a halogen atom in an orthoposition. Preferably, a halogen atom is also present in the other orthoposition. In other positions of the aromatic nucleus, too, halogen atoms may be present as substituents. Suitable nuclear substituents, in an orthoposition, or otherwise with respect to a dichloromethyl group, include, inter alia, alkoxy groups, such as the methoxy group, alkyl groups, such as methyl, nitro groups and/or cyano groups. The halogen atoms present as nuclear substituents are preferably chlorine atoms. A particularly useful reagent is polychlorobenzal chloride of the formula

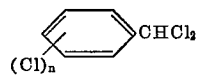

wheren $n$ is an integer from 2 to 3 and at least one chloro substituent is ortho to the dichloromethyl group. Examples of suitable starting materials are in particular the ortho-halobenzal chlorides, such as the 2-chloro-, 2,6-dichloro-, 2,3,6-trichloro-, 6-chloro-2-nitro- and 6-chloro-2-methoxy derivatives concerned. Excellent results are obtained when 2,6-dichlorobenzal chloride is used as the starting material.

As a starting material crude polychlorobenzal chlorides may be used and they are readily obtained by chlorination of toluene derivatives containing chlorine atoms and/or nitro groups, such as o-chloro-, 2,6-dichloro-, 2,3,6-trichloro-, 6-chloro-2-nitro and/or 2,6-dinitrotoluene. In a preferred embodiment of the invention crude 2,6-dichlorobenzal chloride is prepared by chlorination of 6-chloro-2-nitrotoluene at about 170 to 190° C., in the presence of, for instance, pyridine and/or homologues thereof, if desired. Small amounts of pyridine, of not more than 1 weight percent, for example, 0.5 weight percent, are preferred. The crude reaction product can subsequently be used as such as a starting material for the novel process, after a preliminary distillation, if desired; it is advantageous not to isolate the product from the chlorination of 6-chloro-2-nitrotoluene but rather to continue the process of the invention in situ. Larger quantities of pyridine should be avoided since they tend to react with the catalyst, hence requiring a larger initial amount. Therefore, they are preferably removed first, which can be done by, for instance, extraction with hydrochloric acid. Suitable starting materials containing large amounts of 2,6-dichlorobenzal chloride can be prepared, for example, according to the procedure described in British Patent 953,554.

The aromatic o-halodichloromethyl starting material is reacted with chlorine and water. The conversion into carboxylic acid can be represented as follows:

The chlorine required for the reaction is preferably applied in gaseous form as free chlorine. Other chlorinating agents which give off chlorine under the reaction conditions, such as $SO_2Cl_2$, can also be used in special cases. The quantity of chlorine that has to be applied is at least stoichiometric, that is 1 mole per mole of the starting compound for each $CHCl_2$— group present in the molecule. Very favorable results are obtained when not more than 2.5 mole of chlorine per mole of starting material is used. An even larger excess of chlorine is to be avoided to minimize the formation of by-products. Particular preference is given to a quantity between 1.3 and 1.6 moles per mole. If the molecule contains more than one $CHCl_2$— group to be converted, the aforementioned quantities are applicable to each $CHCl_2$— group present in the molecule.

The water required for the conversion can be furnished in liquid form or as steam. The amount of water required for the conversion into the halocarboxylic acid amounts to at least 2 moles per mole of the starting compound for each $CHCl_2$— group to be converted which is present in the molecule. However, smaller quantities may very well be used. In the latter case the resultant reaction product contains, in addition to the carboxylic acid concerned, a corresponding anhydride. If desired, the anhydride may be separated from the carboxylic acid and isolated in the usual manner, such as, for example, the anhydride of 2,6-dichlorobenzoic acid by precipitation with the aid of ethanol. In other cases, however, it is advantageous to prepare a mixture of anhydride and acid and to use it as such for further conversions. Preferably, the anhydride is readily hydrolyzed to the desired acid product by subsequent addition of water to the resultant mixture.

For the preparation of the halocarboxylic acids, 2 to 2.5 moles per mole of starting compound for each $CHCl_2$—group present in the molecule is particularly suitable. Amounts larger than 3 moles per mole frequently cause difficulties when the water is used in liquid form, because the reaction mixture cannot easily be kept at the desired reaction temperature. However, these difficulties are avoided when the water is applied in the form of steam.

In a preferred method of operation, chlorine and water are supplied simultaneously, these reaction components being added continuously throughout the period of reaction. However, variations are also possible, for example intermittent addition of one or both components and/or the supply of increasing or decreasing quantities thereof. It is advantageous to keep the ratio of the amounts of water and chlorine between certain limits, preferably between 1.5 and 2.5 moles of water per mole of chlorine. The duration of the reaction depends, among other factors, on the temperature and feed rate of the components. Particularly preferred reaction times are between 4 and 7 hours.

The process of the invention can be carried out by passing a stream of chlorine through the liquid reaction mixture with stirring and by simultaneously adding water dropwise. If desired, an inert gas, such as nitrogen, can be passed through the reaction mixture together with the chlorine, yielding a stirring effect and facilitating removal of the hydrogen chloride formed in the reaction. The use of oxygen or oxygen-containing gases, in particular air, for the aforementioned purpose may have a favorable influence on the rate of the conversion and/or on the yield. The starting material is preferably present in the molten state. If desired, a solution thereof in an inert solvent can also be used. Useful solvents include halogenated hydrocarbons, such as o-dichlorobenzene and 1,2,4-trichlorobenzene.

CATALYST

The Lewis acid used catalytically in the process of the invention, or a mixture of various Lewis acids, is usually added to the starting material before the supply of chlorine and water is commenced. If desired, the required quantity can also be added continuously or at intervals spread over the reaction period. It has frequently proved particularly advantageous to produce the Lewis acid in situ in the form of its chloride beginning with, for example, an oxide, hydroxide, carbonate or nitrate. Suitable Lewis acids are those derived from elements with an atomic number of from 30 to 83. Especially preferred are the chlorides of antimony, zinc, gallium and iron. Excellent results are obtained particularly with $FeCl_3$. Under certain suitable conditions $FeCl_3$ is known to promote the chlorination of aromatic nuclei.

Catalytic quantities of the Lewis acid are required. These amount to at least 0.005 weight percent and are in general above 0.01 weight percent and not higher than 0.2 weight percent, based on the starting material. Quantities used are preferably between 0.02 and 0.08 weight percent, in particular between 0.04 and 0.06 weight percent. Larger amounts can be used, but do not lead to better results. If no Lewis acid at all is present, hardly any conversion occurs.

REACTION CONDITIONS

The reaction temperatures are between 160 and 200° C., in particular between 170 and 190° C. Temperatures higher than 220° C. favor chlorination of the nucleus, particularly in the presence of $FeCl_3$. It has been found that lower temperatures, for instance approximately 150° C., in combination with a reduced molar quantity of water, mainly lead to the formation of byproducts. A product obtained from 2,6-dichlorobenzal chloride consists of a mixture of the following esters, in which X=Cl or OH:

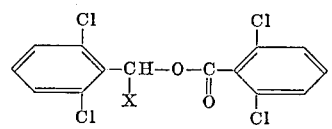

Consequently, reaction temperatures of 170–190° C. are preferred.

The process is generally operated at atmospheric pressure. In certain cases a higher pressure may be desirable, for example when the starting material is a relatively volatile product. However, pressures no higher than 5 or 10 atm. gauge are usually sufficient. Also the process may be carried out batchwise or continuously.

The aromatic o-halocarboxylic acids obtained by the process of the invention possess biocidal and, in particular, herbicidal properties. Derivatives thereof, such as the corresponding nitriles, often have an even higher actvity. The resultant acids alone or together with their anhydrides, can therefore be used to advantage as starting materials for the preparation of such nitriles. For example, the well-known and very useful herbicide 2,6-dichlorobenzonitrile can readily be prepared from 2,6-dichlorobenzoic acid via sequential conversion through the acid chloride and the acid amide.

Example I

The apparatus consisted of a reaction vessel with a capacity of 1 liter, provided with reflux condenser, gas feed tube, stirrer and thermometer. In order to remove the water formed, the reflux condenser was connected via a side tube to a separating funnel. A mixture of 3 moles of 6-chloro-2-nitrotoluene, to which 0.5 weight percent of pyridine had been added, was fed into the reaction vessel and heated to a temperature of 180–185° C. At this temperature a stream of gaseous chlorine was subsequently passed, with stirring, into the mixture for 8 hours at the rate of 0.4 mole of chlorine per mole of 6-chloro-2-nitrotoluene per hour, and then for 8 hours at a rate of 0.25 mole of chlorine per mole of 6-chloro-2-nitrotoluene per hour. The water formed during the reaction was separated from codistilled organic product, and the organic layer recycled to the reaction mixture. 650 grams of reaction product was obtained which according to gas chromatographic analysis contained 1.74 moles of 2,6-dichlorobenzal chloride, 0.2 mole of 2,6-dichlorobenzoyl chloride and 0.18 mole of 2,6-dichlorobenzonitrile.

To 600 grams of the crude reaction product obtained as described above, 0.3 g. of $FeCl_3$ (0.05 weight percent of starting material) was added in the same reaction vessel without preliminary purification. Next a stream of gaseous chlorine at a rate of 0.3 mole of chlorine (21.3 g.) per hour, together wi h an air stream at a rate of 10 liters per hour were passed through the mixture with stirring at a temperature of 180–185° C. for 7 hours, 0.7 mole of water (12.6 g.) per hour simultaneously being added dropwise. 505 grams of product was obtained which contained 4.16 milliequivalents of acid per gram, corresponding to a yield of 2,6-dichlorobenzoic acid of 76% of theory based on 6-chloro-2-nitrotoluene. The product can be purified by conventional techniques, for example by extraction with aqueous bicarbonate solution and/or crystallization from water.

Example II

The starting material was 2,6-dichlorobenzal chloride (DCBA) prepared according to the procedure described in the first paragraph of Example I, the difference being that the crude mixture thus obtained was first subjected to a distillation.

To 57.5 grams of the distilled mixture, which included 42 grams (183 mmoles) of 2,6-dichlorobenzal chloride and 4.8 grams (23 mmoles) of 2,6-dichlorobenzoyl chloride (DCBO), 25 mg. of anhydrous $FeCl_3$ was added. Then chlorine and air were passed into the reaction mixture for six hours at a rate of 30 mmoles per hour and 10 liters per hour, respectively, in a manner analogous to that described in the second paragraph of Example I while simultaneously 70 mmoles of water per hour was added dropwise. When the reaction mixture was allowed to cool down, the 2,6-dichlorobenzoic acid formed crystallized. The yield amounted to 208 mmoles (40 g.) and was practically quantitative, calculated on the sum of dichlorobenzal chloride and dichlorobenzoyl chloride (DCBA+DCBO)

As shown in Table 1 below, the yield obtained corresponds to that obtained when the crude 2,6-dichlorobenzal chloride was used without preliminary distillation.

Table 1 also includes data of an experiment in which a smaller amount of water was used, namely 40 mmoles per hour instead of 70 mmoles per hour. In this instance a considerable quantity of the corresponding anhydride was formed in addition to 2,6-dichlorobenzoic acid (DCBAC).

TABLE 1

| Starting product: | | | |
|---|---|---|---|
| Pretreatment | [1] None | [2] Distilled | [2] Distilled |
| Total, grams | 60 | 57.4 | 50.4 |
| DCBA, mmole | 161 | 183 | 160 |
| DCBO, mmole | 18 | 23 | 20 |
| Water, mmole/hr | 70 | 70 | 40 |
| Reaction time, hr | 7 | 6 | 6 |
| Yield: | | | |
| DCBAC, mmole | 210 | 208 | 110 |
| Anhydride, mmole | | | 34 |

[1] Composition: 61.5% w. DCBA, 6.3% w. DCBO, 4.6% w. 2,6-dichlorobenzonitrile, 8.7% w. trichlorobenzene.
[2] Composition: 73.3% w. DCBA, 8.4% w. DCBO, 7.6% w. 2,6-dichlorobenzonitrile, 5.5% w. trichlorobenzene.

Example III

In a manner analogous to that described in Example II, but in the presence of Lewis acids other than $FeCl_3$, the crude distilled 2,6-dichlorobenzal chloride was converted into 2,6-dichlorobenzoic acid. The Lewis acids used were $ZnCl_2$, $SbCl_5$ and $GaCl_3$, the last-mentioned compound being formed in situ from the corresponding oxide ($Ga_2O_3$).

The starting product consisted mainly of 71 mole percent of 2,6-dichlorobenzal chloride and 10 mole percent of 2,6-dichlorobenzoyl chloride. The reaction was carried out at 180° C. The feed rates were as follows: water, 83 mmoles per hour; chlorine, 30 mmoles per hour; air, 10 liters per hour.

As shown in Table 2 below, the various Lewis acids can be effectively utilized.

TABLE 2

| Starting product: | | | |
|---|---|---|---|
| Total, grams | 54.9 | 55.4 | 60 |
| DCBA, mmole | 168 | 170 | 184 |
| DCBO, mmole | 22.5 | 22.6 | 24.6 |
| Lewis acid: | | | |
| $ZnCl_2$, percent wt | 0.064 | | |
| $SbCl_5$, percent wt | | 0.064 | |
| $Ga_2O_3$, percent wt | | | 0.932 |
| Total Water, mmole | 415 | 415 | 444 |
| Reaction time, hr | 6 | 6 | 6 |
| Yield of DCBAC, mmole | 198 | 201 | 223 |

We claim as our invention:

1. The process for preparing polychlorobenzoic acids by reacting at a temperature of from about 160° C. to about 200° C. polychlorobenzal chlorides of the formula

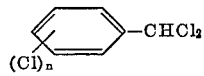

wherein $n$ is an integer from 2 to 3 and at least one chloro substituent is ortho to the dichloromethyl group, chlorine, and water, in the presence of from 0.005 to 0.2 weight percent, based on polychlorobenzal chloride, of a Lewis acid catalyst which is a chloride of antimony, gallium, iron, or zinc.

2. The process in accordance with claim 1 wherein the polychlorobenzal chloride is 2,6-dichlorobenzal chloride.

3. The process in accordance with claim 2 wherein the temperature range is from about 170° to about 190° C.

4. The process in accordance with claim 2 conducted in the presence of from 0.04 to 0.06 weight percent, based on 2,6-dichlorobenzal chloride, of said Lewis acid catalyst.

5. The process in accordance with claim 4 wherein the Lewis acid is ferric chloride.

6. The process in accordance with claim 3 wherein the 2,6-dichlorobenzal chloride is produced without subsequent isolation by reacting 6-chloro-2-nitrotoluene with chlorine at a temperature between from about 170° C. to about 190° C. in the presence of no more than 1 weight percent, based on 6-chloro-2-nitrotoluene, of pyridine.

References Cited

UNITED STATES PATENTS 3,223,728   12/1965   Bella _____ 260—515

LORRAINE A. WEINBERGER, Primary Examiner

M. G. BERGER, Assistant Examiner

U.S. Cl. X.R.

260—476. 651